(12) United States Patent
Diosi et al.

(10) Patent No.: US 7,611,438 B2
(45) Date of Patent: Nov. 3, 2009

(54) MULTISPEED TRANSMISSION

(75) Inventors: Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen, Friedrichshafen (DE)

( * ) Notice: Subject to any disclaimer, the term of this patent is extended or adjusted under 35 U.S.C. 154(b) by 413 days.

(21) Appl. No.: 11/660,416

(22) PCT Filed: Oct. 27, 2004

(86) PCT No.: PCT/EP2004/012107

§ 371 (c)(1),
(2), (4) Date: Feb. 16, 2007

(87) PCT Pub. No.: WO2006/024326

PCT Pub. Date: Mar. 9, 2006

(65) Prior Publication Data

US 2007/0259753 A1    Nov. 8, 2007

(30) Foreign Application Priority Data

Aug. 27, 2004 (DE) ........................ 10 2004 041 446

(51) Int. Cl.
*F16H 3/62* (2006.01)
(52) U.S. Cl. ...................................... 475/276
(58) Field of Classification Search ................. 475/275, 475/276
See application file for complete search history.

(56) References Cited

U.S. PATENT DOCUMENTS

| 4,395,925 | A | 8/1983 | Gaus |
| 6,139,463 | A | 10/2000 | Kasuya et al. |
| 6,558,287 | B2 | 5/2003 | Hayabuchi et al. |
| 6,572,507 | B1 | 6/2003 | Korkmaz et al. |
| 6,634,980 | B1 | 10/2003 | Ziemer |
| 6,634,981 | B1* | 10/2003 | Raghavan et al. ........... 475/275 |
| 6,659,903 | B1 | 12/2003 | Bucknor et al. |
| 6,659,904 | B1 | 12/2003 | Usoro et al. |
| 6,716,131 | B1 | 4/2004 | Usoro et al. |
| 6,723,019 | B2* | 4/2004 | Lee et al. .................... 475/276 |
| 6,860,831 | B2 | 3/2005 | Ziemer |
| 7,018,319 | B2 | 3/2006 | Ziemer |

(Continued)

FOREIGN PATENT DOCUMENTS

DE    29 36 969 A1    4/1981

(Continued)

*Primary Examiner*—Dirk Wright
(74) *Attorney, Agent, or Firm*—Davis & Bujold, P.L.L.C.

(57) ABSTRACT

A transmission with forward and reverse gears includes a drive and an output shaft, planetary sets, shafts and shift elements. The drive shaft communicates with a sun gear of the second planetary set and a shaft which communicates with the carrier of the first planetary set, and to the housing and is connectable with another shaft, which communicates with the carrier of the second planetary set and communicates with a shaft. This shaft communicates with sun gear of the first planetary set and the ring gear of the third planetary set. A shaft communicates with the ring gear of the second planetary set and the carrier of the third planetary set and can couple to the housing. A shaft communicates with the sun gear of the third planetary set and to the housing. The output shaft communicates with the ring gear of the first planetary set.

30 Claims, 2 Drawing Sheets

U.S. PATENT DOCUMENTS

| | | | |
|---|---|---|---|
| 7,273,438 B2 * | 9/2007 | Tiesler et al. | 475/284 |
| 2003/0195079 A1 | 10/2003 | Raghavan et al. | |
| 2007/0202984 A1 * | 8/2007 | Gumpoltsberger | 475/323 |
| 2007/0213169 A1 * | 9/2007 | Gumpoltsberger | 475/275 |
| 2007/0213170 A1 * | 9/2007 | Gumpoltsberger | 475/284 |
| 2008/0015079 A1 * | 1/2008 | Gumpoltsberger | 475/271 |
| 2008/0293535 A1 * | 11/2008 | Phillips et al. | 475/275 |
| 2009/0023535 A1 * | 1/2009 | Wittkopp et al. | 475/275 |
| 2009/0023538 A1 * | 1/2009 | Carey et al. | 475/275 |
| 2009/0036254 A1 * | 2/2009 | Wittkopp et al. | 475/275 |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 102 13 820 A1 | 10/2002 |
| DE | 10 2004 040 599 A1 | 3/2006 |
| EP | 0 434 525 A1 | 6/1991 |

* cited by examiner

| SPEED | CLUTCH | | | BRAKE | | | GEAR RATIO | STEP |
|---|---|---|---|---|---|---|---|---|
| | 15 | 57 | 67 | 03 | 04 | 05 | i | φ |
| 1 | | ● | | | ● | ● | 4.600 | |
| | | | | | | | | 1.642 |
| 2 | | ● | | ● | ● | | 2.800 | |
| | | | | | | | | 1.580 |
| 3 | | ● | ● | | ● | | 1.773 | |
| | | | | | | | | 1.475 |
| 4 | ● | ● | | | ● | | 1.202 | |
| | | | | | | | | 1.202 |
| 5 | ● | ● | ● | | | | 1.0 | |
| | | | | | | | | 1.249 |
| 6 | ● | | ● | | ● | | 0.800 | |
| | | | | | | | | 1.154 |
| 7 | ● | | ● | ● | | | 0.694 | |
| | | | | | | | | 1.090 |
| 8 | ● | | | ● | ● | | 0.636 | |
| R | | | ● | | ● | ● | -3.100 | TOTAL 7.225 |

Fig. 3

| SPEED | CLUTCH | | | BRAKE | | | GEAR RATIO | STEP |
|---|---|---|---|---|---|---|---|---|
| | 15 | 57 | 67 | 03 | 04 | 05 | i | φ |
| 1 | | ● | | | ● | ● | 4.019 | |
| | | | | | | | | 1.559 |
| 2 | | ● | | ● | ● | | 2.577 | |
| | | | | | | | | 1.470 |
| 3 | | ● | ● | | ● | | 1.753 | |
| | | | | | | | | 1.425 |
| 4 | ● | ● | | | ● | | 1.231 | |
| | | | | | | | | 1.231 |
| 5 | ● | ● | ● | | | | 1.0 | |
| | | | | | | | | 1.246 |
| 6 | ● | | ● | | ● | | 0.803 | |
| | | | | | | | | 1.148 |
| 7 | ● | | ● | ● | | | 0.699 | |
| | | | | | | | | 1.000 |
| 8 | ● | | | ● | ● | | 0.636 | |
| R | | | ● | | ● | ● | -3.067 | TOTAL 6.316 |

Fig. 4

MULTISPEED TRANSMISSION

This application is a national stage completion of PCT/EP2004/012107 filed Oct. 27, 2004, which claims priority from German Application Serial No. 10 2004 041 446.7 filed Aug. 27, 2004.

FIELD OF THE INVENTION

This invention involves a multispeed transmission of a planetary design, in particular an automatic transmission for a motor vehicle.

BACKGROUND OF THE INVENTION

According to the state of the technology, automatic transmissions, especially for motor vehicles, include planetary sets which can be shifted by way of friction or shift elements, like clutches and brakes, and are usually associated with a starting element subject to a slippage effect and optionally with a bridge clutch, like a hydro-dynamic torque converter or a fluid coupling.

Such a transmission is known from EP 0 434 525 A1. It basically includes a drive shaft and an output shaft which are placed parallel to each other, a main gear set that is positioned concentrically to the output shaft and constructed as a double web, four shaft, planetary transmission and connectable to the drive shaft, an upstream gear set connected to the drive shaft and connectable to the main gear set, as well as five shift elements in the form of three clutches and two brakes whose selective blocking in pairs determines the various gear translations between the drive shaft and the output shaft. In the process, the transmission manifests two power paths so that six forward gears can be obtained by a selective engagement in pairs of the five shift elements.

In the process, two clutches are needed to transfer the torque from the upstream gear set to the two elements of the main gear set. These are basically positioned in the direction of power flow behind the upstream gear set in the direction of the main gear set. Another clutch is provided in the second power path which connects it in a disengageable manner with another element of the main gear set. In the process the two clutches are so positioned that the interior disc carrier forms the output.

In addition, a compact multispeed transmission of a planetary design, in particular for motor vehicles, is known from U.S. Pat. No. 6,139,463 which manifests two planetary gear sets coupled to each other and an upstream gear set, as well as three clutches and two brakes. In this known multispeed transmission, two clutches C-1 and C-3 are provided in the first power path to transfer the torque from the upstream gear set to both coupled planetary gear sets. In the process, the outer disc carrier or the cylinder or the pistons and the pressure compensation side of clutch C-3 are connected with a first brake B-1. In addition, the interior disc carrier of the third clutch C-3 is connected with the cylinder or the piston and the pressure compensation side of the first clutch C-1, where the interior disc carrier of the first clutch C-1 is placed on the output side and is connected with a sun gear of the third planetary gear set.

In addition, a multispeed transmission is known from DE 199 49 507 A1 from this Applicant, in which two non-shifting upstream gear sets are provided on the drive shaft which produce two rotational speeds on the output side that, in addition to the rotational speed of the drive shaft, are able to be engaged and disengaged on a multi-member shiftable main planetary gear set acting on the output shaft by way of selective engagement of the shifting elements used in such a way that to shift from one gear to the next higher or lower gear only one shift element of the two activated shift elements must be engaged or disengaged.

An automatic shifting motor vehicle transmission with three planetary gearsets as well as three brakes and two clutches for shifting six forward and one reverse gear and with a drive shaft and output shaft is known from DE 199 12 480 A1. The automatic shifting motor vehicle transmission is so constructed that the drive shaft is directly connected with the sun gear of the second planetary set and the output shaft is connectable with the sun gear of the first planetary set via the first clutch and/or the carrier of the first planetary set via the second clutch. Additionally or alternatively, the sun gear of the first planetary set is connectable, via the first brake, with the housing of the transmission and/or the carrier of the first planetary set, via the second brake, with the housing and/or the sun gear of the third planetary set, via the third brake, with the housing.

From DE 102 13 820 A1, a multiple gear automatic transmission is also known and includes an initial input path T1 with an initial transmission ratio, an input path T2 which has a larger transmission ratio than input path T1, a planetary gear set with four elements, where the four elements are a first element, a second element, a third element and a fourth element in the sequence of elements in a rotational speed diagram, a clutch C-2 which conveys the rotation of the input path T2 to the first element S3, a clutch C-1 which transfers the rotation of input path T2 to the fourth element S2, a clutch C-4 which conveys a rotation of input path T1 to the first element, a clutch C-3 which transfers the rotation of input path T1 to the second element C3, a brake B-1 which engages the fourth element, a brake B-2 which engages the second element and an output element which is coupled to the third element R3.

In the context of the applicant's DE 101 15 983 A1, a multispeed transmission is described with a drive shaft which is coupled to the upstream set with an output shaft, which is connected to a set connected downstream, and with a maximum of seven shift elements by way of whose selective shifting at least seven forward gears can be selected without a compound transmission. The upstream set is formed from an upstream planetary gear set or a maximum of two non-shiftable upstream planetary gear sets coupled with the first upstream planetary gear set, where the set connected downstream is constructed as a two-carrier, four shaft gear with two shiftable planetary gear sets connected downstream and manifests four shafts. The first free shaft of this two-carrier, four shaft transmission is connected with the first shift element, the second free shaft with the second and third shift elements, the third free shaft with the fourth and fifth shift elements and the fourth free shaft is connected with the output shaft. For a multispeed transmission with a total of six shift elements, it is recommended in the invention that the third free shaft or the first free shaft of the set connected downstream also be connected with a sixth shift element. For a multispeed transmission with a total of seven shift elements, it is recommended in the invention that the third free shaft also be connected with a sixth shift element (D') and the first free shaft also with a seventh shift element.

In addition, in the Applicant's DE 101 15 987, a multispeed transmission with eight gears is described. This transmission consists of a shiftable upstream gear set and a shiftable gear set connected downstream in addition to a drive shaft and an output shaft. The upstream gear set consists of a first planetary gear set which offers, in addition to the input rotational speed of the drive shaft, a second rotational speed which can selectively be switched to the gear set connected downstream. The gear set connected downstream consists of two coupled planetary gear sets. By using two power paths and six shift elements, eight forward gears can be shifted without a compound transmission. An 8 gear multispeed transmission is also known from DE 29 36 969; it includes eight shift elements and four gear sets.

A multispeed transmission is also known from U.S. Pat. No. 6,716,131 B1 which includes three coupled minus-planetary gear sets, three clutches and two brakes. These transmissions can be constructed as 5 gear, 6 gear and 7 gear transmissions, where one element of one of the planetary sets is permanently connected with the housing to prevent rotation so that the transmission manifests six rotating shafts.

In general, automatically shifting vehicle transmissions with a planetary design have already been described extensively in the state of the technology and are subjected to constant further development and improvement. These transmissions should thus have a sufficient number of forward gears as well as a reverse gear and a transmission ratio well suited for vehicles with a high overall spread of gear ratios as well as favorable progressive ratios. In addition, it should enable a high starting transmission ratio in the forward direction and contain a direct gear as well as being suitable for use in both cars and commercial vehicles. Moreover, this transmission should require a low construction cost and, in particular, a small number of shift elements and avoid so-called compound transmission shifts during sequential shifting so that, when shifting from one gear to the next higher or the next lower gear, only one previously engaged shift element is opened and only one previously not selected shift element is engaged.

This invention has the goal of proposing a multispeed transmission of the type specified above in which the construction cost is optimized and, in addition, the degree of effectiveness is improved in the main drive gears in terms of drag and gearing losses. In addition, according to this invention, in the multi-stage transmission the torque acting on the shift elements and planetary sets should be limited and the rotational speed of the shafts, shift elements and planetary sets should be kept as low as possible. Additionally, the number of gears and the spread of gear ratios should be increased so that at least eight forward gears and at least one reverse gear are advantageously obtainable. In addition, according to this invention, the transmission should be suitable for installation in any configuration in any vehicle, especially for a front-transverse arrangement.

SUMMARY OF THE INVENTION

Accordingly, a multispeed transmission with a planetary design with a drive shaft and an output shaft that are placed in a housing is proposed. Also provided are at least three planetary gearsets (hereafter called the first, second and third planetary gearsets) at least seven rotatable shafts (hereafter called a drive shaft), an output shaft, a third, fourth, fifth, sixth and seventh shaft, as well as at least six shift elements, including brakes and clutches whose selective engagement causes various transmission ratios between the drive shaft and the output shaft so that preferably at least eight forward gears and at least one reverse gear are attained.

Here the drive shaft is constantly connected with the sun gear of the second planetary set and via a clutch detachably connectable with the fifth shaft that is constantly connected with the carrier of the first planetary set, able to be coupled to the housing via a brake and via another clutch detachably connected with the seventh shaft which is constantly connected with the carrier of the second planetary set and detachably connectable via another clutch with the sixth shaft.

According to the invention, the sixth shaft is constantly connected with the sun gear of the first planetary set and the ring gear of the third planetary set, where the third shaft is constantly connected with the ring gear of the second planetary set and the carrier of the third planetary set and can be coupled to the housing via another brake. In the invention, the fourth shaft is constantly connected with the sun gear of the third planetary set and can be coupled to the housing via another brake. The output shaft is constantly connected with the ring gear of the first planetary set.

Due to the design of the multispeed transmission, according to the invention, there are suitable transmission ratios especially for passenger vehicles as well as a significant increase of the overall spread of gear ratios of the multispeed transmission, resulting in improved driving comfort and a significant reduction of waste.

In addition, with the multispeed transmission as described in this patent, the construction cost will be significantly reduced by using a small number of shift elements, preferably three brakes and three clutches. With the multispeed transmission, as described in this patent, in an advantageous manner, it is possible to start driving with a hydrodynamic converter, an external starter coupling or also with other suitable external starting elements. To begin driving, a starting element integrated into the transmission is also possible. Preferably, a shift element is suitable which can be engaged in the first forward gear and in reverse gear.

The main drive gears of the multispeed transmission, as described in this patent, are also highly efficient as a result of low drag and gearing losses.

In addition, low torque are present in the shift elements and in the planetary sets of the multispeed transmission, where the wear in the multispeed transmission is advantageously reduced. Furthermore, correspondingly small dimensions are facilitated because of the small torque, where the construction area required and the associated costs are reduced. There are also low rotational speeds in the shafts, the shift elements and the planetary sets.

Furthermore, as described in this patent, the transmission is so conceived as to be easier to adapt to various power train configurations both in terms of the power flow direction and the spatial aspect. Thus it is possible, for example, to have the power and output on the same side of the housing.

BRIEF DESCRIPTION OF THE DRAWINGS

The invention will now be described, by way of example, with reference to the accompanying drawings in which:

FIG. 3 is an example of a shifting diagram for the multispeed transmission as described in this patent according to FIG. 1 and FIG. 2, and FIG. 4 is another example of a shifting diagram for the multispeed transmission as described in this patent according to FIG. 1 and FIG. 2.

DETAILED DESCRIPTION OF THE INVENTION

Figure 1:
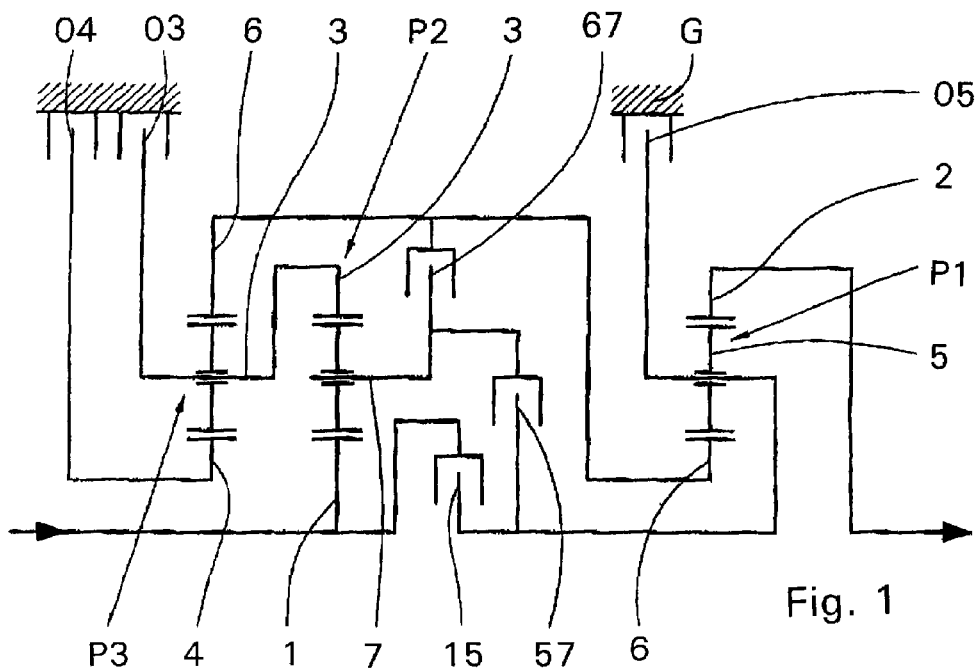
FIG. 1 is a schematic depiction of a preferred version of a multispeed transmission as described in this patent.
Figure 2:
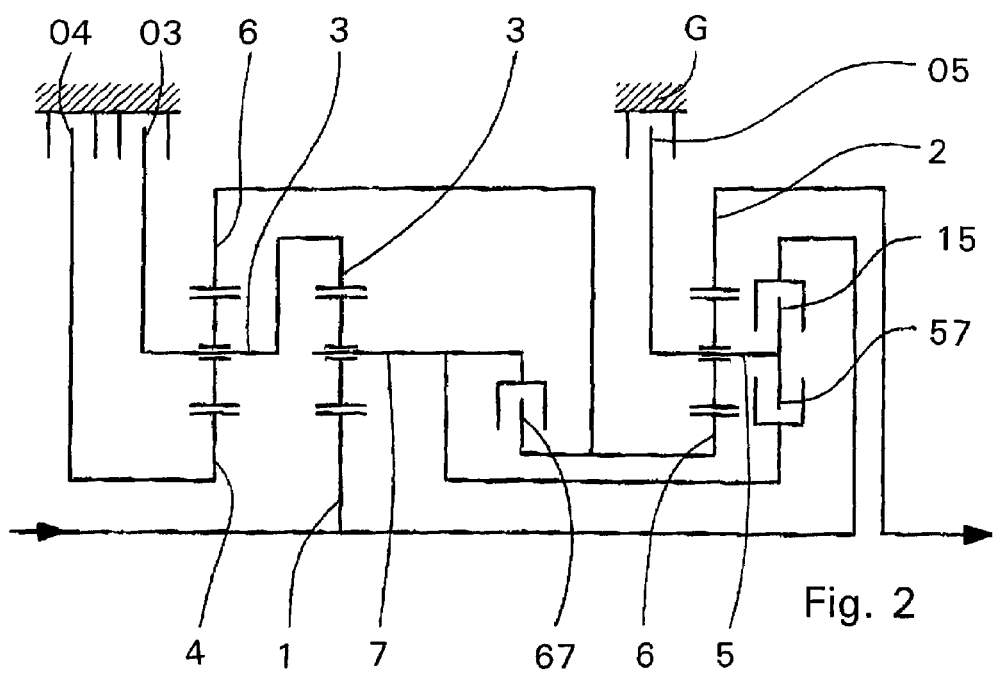
FIG. 2 is a schematic depiction of a second preferred version of a multi-stage transmission as described in this patent.

Shown in FIG. 1 and FIG. 2 is a multispeed transmission, as described in this patent, with a drive shaft 1 and an output shaft 2 which are placed in a housing G. Three planetary gearsets P1, P2, P3 are shown, which are constructed as negative-planet gear sets and are preferably positioned in the sequence P3, P2, P1 in an axial direction. As is known, a negative-planetary gearset has planet gears which mesh with the sun and ring gears of this planetary gearset.

As can be seen in FIG. 1 and FIG. 2, six shift elements are provided, namely brakes 03, 04, 05 and three clutches 15, 57 and 67. Preferably, the clutches are constructed as multiple disc clutches.

Using the shift elements, selective shifting of eight forward gears and one reverse gear is possible. The multispeed transmission, as described in this patent, has a total of seven rotatable shafts, namely shafts 1, 2, 3, 4, 5, 6 and 7.

According to the invention, the multispeed transmission of FIG. 1 and FIG. 2 envisages that power input occurs from shaft 1, which is constantly connected with the sun gear of the second planetary set P2 and is detachably connectable via clutch 15 with shaft 5, which is constantly connected with the carrier of the first planetary set P1, is able to be coupled via brake 05 to the housing G and is detachably connectable via clutch 57 with shaft 7 which is constantly connected with the carrier of the second planetary set P2 and detachably connectable via clutch 67 with shaft 6.

According to the invention, shaft 6 is constantly connected with the sun gear of the first planetary set P1 and the internal gear of the third planetary set P3, where the shaft 3 is constantly connected with the ring gear of the second planetary set P2 and the carrier of the third planetary set P3 and is able to be coupled to the housing via brake 03. In addition, shaft 4 is constantly connected with the sun gear of the third planetary set P3 and is able to be coupled to the housing G via brake 04. The output shaft 2, as described in this patent, is constantly connected with the ring gear of the first planetary set P1.

In the version described in FIG. 1, the clutches of the transmission, namely clutches 15, 57 and 67, are positioned between the second planetary set P2 and the first planetary set P1, when viewed axially. In addition, when viewed radially, clutch 67 is placed basically above clutches 57 and 15, whereby clutch 57 can basically be placed above clutch 15, so that a very compact manner of construction can advantageously be obtained.

When viewed radially, the outer disc carrier of clutch 67 can preferably be moved above clutches 57 and 15; in addition, the outer disc carrier of clutch 57, when viewed radially, can be moved above clutch 15.

In the version of the transmission described in this patent shown in FIG. 2, the clutch 67, when viewed axially, is placed between the second and the first planetary set P2, P1; when viewed radially, the clutch 67 is basically placed at the elevation of the sun gear of the second planetary set P2. In addition, the clutch 15, when viewed radially, is basically placed above clutch 57, whereby clutches 15 and 57 can share a common inner disc carrier. When viewed axially, clutches 15 and 57 are preferably placed in the direction of power flow behind the first planetary set P1.

The spatial arrangement of the shift element within the transmission can be as desired and is only limited by the dimensions and the exterior shape of the transmission housing G.

FIGS. 3 and 4 show examples of shift diagrams of the multispeed transmission as described in this patent and illustrated in FIG. 1 and FIG. 2.

For each gear, three shift elements are engaged. Examples of values for each transmission ratio i for the individual gear ratios and a resulting step ratio (p, to be determined, can be determined from the shifting diagram. It can be seen in FIGS. 3 and 4 that during sequential shifting, any double shifting or group shifting is avoided, since two adjacent gear ratios share two shift elements. The progressive ratios in the upper gears are advantageously small. In addition, the fifth gear is designed as a direct drive gear.

The shifting diagrams shown in FIGS. 3 and 4 only differ in the values for the transmission and the gear ratios because of the different underlying stationary transmission gear ratios of planetary sets P1, P2, P3 which amount for the shifting diagram in FIG. 3 to minus 1.75, minus 3.4 and minus 3.4 and, for the shifting diagram in FIG. 4 to minus 1.75, minus 3.05 and minus 3.05. The shift logic, namely the allocation of the engaged shift elements to the individual gears, is identical in FIGS. 3 and 4.

The first forward gear results from the engagement of clutch 57 and brakes 04 and 05; the second forward gear from the engagement of brakes 03 and 04 and clutch 57; the third forward gear by the engagement of clutches 57 and 67 and brake 04; and the fourth forward gear by the engagement of clutches 15 and 57 and brake 04. Furthermore, the fifth forward gear results from the engagement of clutches 15, 57 and 67; the sixth forward gear from the engagement of clutches 15 and 67 and brake 04; the seventh forward gear by the engagement of clutches 15 and 67 and brake 03; and the eighth forward gear by the engagement of clutch 15 and brakes 03 and 04.

As can be seen in the shifting diagrams in FIGS. 3 and 4, the reverse gear results from the engagement of brakes 04 and 05 and clutch 67.

If needed, a second reverse gear can be provided (not depicted in FIGS. 3 and 4) which results from the engagement of brakes 03 and 05 and clutch 67. On the basis of the stationary transmission gear ratios from FIG. 1, the gear ratio in this second reverse gear amounts to a minus 7.689 and thus represents a so-called crawler gear ratio.

According to the invention, the starting of the motor vehicle is possible with a starting element integrated into the transmission. Hereby a shift element is especially suited, which is needed in the first gear and the reverse gear, namely in brake 04 or brake 05, for example.

According to the invention, different gear transmission ratio can result from the same transmission diagram depending on the stationary transmission gear ratios of the individual planetary sets so that variations are possible for specific applications or vehicles.

It is also possible to provide additional override clutches at any suitable position on the multispeed transmission, for example, between a shaft and the housing or to connect two shafts, if applicable.

According to the invention, an axis differential and/or a distributor differential can be placed on the drive side or the output side.

An advantageous further development is possible by separating drive shaft 1 from a drive motor by a clutch element, if needed, whereby a hydrodynamic converter, a hydrodynamic clutch, a dry starting clutch, a wet starting clutch, a magnetic powder clutch or a centrifugal force clutch can be used as the clutch element. It is also possible to place such a starter element in the direction of power flow behind the transmission where, in this case, the drive shaft 1 is constantly connected with the crankshaft of the motor.

The multispeed transmission, as described in this patent, also permits the placement of a torsion oscillation damper between the motor and the transmission.

As a further version of the transmission as described in this patent (not shown), a wear-free brake, such as a hydraulic or electric retarder or something similar, can be placed on each shaft, preferably the drive shaft 1 or output shaft 2, which is especially of significance for use in commercial vehicles. Furthermore, to start additional units, a power-take-off can be envisaged on each shaft, preferably on the drive shaft 1 or the output shaft 2.

The shift elements used can be constructed as power shift clutches or brakes. In particular, frictional clutches or brakes, such as for example, multiple disc clutches, strap brakes and/or cone clutches can be used. In addition, frictional brakes and/or clutches, such as for example, synchronizations or claw clutches, can be used as the shift elements.

Another advantage of the multispeed transmission presented here is that an electric device can be attached to each shaft as a generator and/or additional drive machine.

Naturally, every form of design, especially each spatial arrangement of the planetary sets and the shift elements in themselves and with respect to each other in so far as makes technical sense falls under the scope of protection of the claims without influencing the function of the transmission as stated in the claims, even if these variations are not explicitly described in the Figures or in the description.

REFERENCE NUMERALS

1 shaft, drive shaft
2 shaft, output shaft
3 shaft
4 shaft
5 shaft
6 shaft
7 shaft
03 second brake
04 third brake
05 first brake
15 first clutch
57 second clutch
67 third clutch
P1 first planetary set
P2 second planetary set
P3 third planetary set
i transmission ratio
φ step ratio
G housing

The invention claimed is:

1. A multispeed automatic transmission, of a planetary gear design, for a motor vehicle, the transmission comprising:
   a drive shaft (1) and an output shaft (2) located within a housing (G);
   first, second and third planetary gear sets (P1, P2, P3);
   at least additional third, fourth, fifth, sixth and seventh rotating shafts (3, 4, 5, 6, 7);
   a plurality of shift elements (03, 04, 05, 15, 57, 67), including first, second and third brakes (03, 04, 05) and first, second and third clutches (15, 57, 67), whose selective engagement results in a plurality transmission gear ratios between the drive shaft (1) and the output shaft (2) and achieves at least eight forward gears and at least one reverse gear;
   a sun gear of the second planetary gear set (P2) being fixed the drive shaft (1) and being detachably coupled, via the first clutch (15), with the fifth shaft (5);
   a carrier of the first planetary gear set (P1) being fixed to the fifth shaft (5) and being detachably coupled, via the third brake (05), to the housing (0), and being detachably coupled, via the second clutch (57), to the seventh shaft (7);
   a carrier of the second planetary gear set (P2) being fixed to the seventh shaft (7) and being detachably coupled, via the third clutch (67), to the sixth shaft (6);
   a sun gear of the first planetary gear set (P1) and a ring gear of the third planetary gear set (P3) being fixed to the sixth shaft (6);
   a ring gear of the second planetary gear set (P2) and a carrier of the third planetary gear set (P3) being fixed to the first shaft (3) and being detachably coupled, via the first brake (03), with the housing (G);
   a sun gear of the third planetary gear set (P3) being fixed to the fourth shaft (4) and being detachably coupled, via the second brake (04), with the housing (G); and
   a ring gear of the first planetary gear set (P1) being fixed to the output shaft (2).

2. The multispeed automatic transmission according to claim 1, wherein the second planetary gear set (P2) is sequential located, in an axially direction of the transmission, behind the third planetary gear set (P3) and the first planetary gear set (P1) is sequential located behind the second planetary gear set (P2).

3. The multispeed automatic transmission according to claim 1, wherein the first, the second and the third planetary gear sets (P1, P2, P3) are negative planetary gear sets.

4. The multispeed automatic transmission according to claim 1, wherein in an axial direction of the transmission the first, the second and the third clutches (15, 57, 67) are located between the second planetary gear set (P2) and the first planetary gear set (P1).

5. The multispeed automatic transmission according to claim 1, wherein the third clutch (67), when viewed radially of the transmission, is located radially above the second clutch (57) and the first clutch (57, 15).

6. The multispeed automatic transmission according to claim 1, wherein an outer disc carrier of the third clutch (67), when viewed radially of the transmission, is located radially above the second clutch (57) and the first clutch (15).

7. The multispeed automatic transmission according to claim 1 wherein an outer disc carrier of the second clutch (57), when viewed radially of the transmission, is located radially above the first clutch (15).

8. The multispeed automatic transmission according to claim 1, wherein the third clutch (67), when viewed axially of the transmission, is located between the second planetary gear set (P2) and the first planetary gear set (P1).

9. The multispeed automatic transmission according to claim 1, wherein the third clutch (67), when viewed radially of the transmission, is located substantially at a radial height of the sun gear of the second planetary gear set (P2).

10. The multispeed automatic transmission according to claim 1, wherein the first clutch (15), when viewed radially of the transmission, is located radially above the second clutch (57).

11. The multispeed automatic transmission according to claim 10, wherein the first clutch (15) and the second clutch (57) have a common interior disc carrier.

12. The multispeed automatic transmission according to claim 1, wherein the first clutch (15) and the second clutch (57), when viewed axially in a power flow direction through the transmission, are located behind the first planetary set (P1).

13. The multispeed automatic transmission according to claim 1, wherein a first forward gear results from engagement of the second clutch (57), the second brake (04) and the third brake (05, 04), a second forward gear results from engagement of the first brake (03), the second brake (03, 04) and the second clutch (57), a third forward gear results from engagement of the second clutch (57), the third clutch (57, 67) and the second brake (04), a fourth forward gear results from engagement of the first clutch (15), the second clutch (57) and the second brake (04), a fifth forward gear results from engagement of the first clutch (15), the second clutch (57) and the third clutch (67), a sixth forward gear results from engagement of the first clutch (15), the third clutch (67) and the second brake (04), a seventh forward gear results from engagement of the first clutch (15), the third clutch (67) and the first brake (03) and an eighth forward gear results from engagement of the first clutch (15), the first brake (03) and the second brake (04).

14. The multispeed automatic transmission according to claim 1, wherein the at least one reverse gear results from engagement of one of:
the second brake (04), the third brake (05) and the third clutch (67), and
the first brake (03), the third brake (05) and the third clutch (67).

15. The multispeed automatic transmission according to claim 1, wherein at least one additional override clutch is located at any suitable position within the transmission.

16. The multispeed automatic transmission according to claim 15, the at least one override clutch is located between one of the drive shaft (1), the output shaft (2), the third, the fourth, the fifth, the sixth and the seventh rotating shafts (3, 4, 5, 6, 7) and the housing (G).

17. The multispeed automatic transmission according to claim 1, wherein the drive shaft (1) and the output shaft (2) extend from a same side of the housing (G).

18. The multispeed automatic transmission according to claim 1, wherein at least one of an axial differential and a distributor differential is located on one of the drive shaft (1) and the output shaft (2).

19. The multispeed automatic transmission according to claim 1, wherein an additional clutch element separates the drive shaft (1) from a motor of the vehicle.

20. The multispeed automatic transmission according to claim 19, wherein the additional clutch element is one of a hydro-dynamic converter, a hydro-dynamic clutch, a dry starting clutch, a wet starting clutch, a magnetic powder clutch and a centrifugal force clutch.

21. The multispeed automatic transmission according to claim 1, wherein an external starting element is located, in a power flow direction, behind the transmission, and the drive shaft (1) is fixed to a crankshaft of a motor of the vehicle.

22. The multispeed automatic transmission according to claim 1, wherein driving movement of the vehicle is initiated by engagement of one of the second brake (04) and the third brake (05), and the drive shaft (1) constantly communicates with a crankshaft of a motor of the vehicle.

23. The multispeed automatic transmission according to claim 1, wherein a torsion oscillation dampener is located between a motor of the vehicle and the transmission.

24. The multispeed automatic transmission according to claim 1, wherein a wear-free brake is located on at least one of the drive shaft (1), the output shaft (2), the third rotating shaft (3), the fourth rotating shaft (4), the fifth rotating shaft (5), the sixth rotating shaft (6) and the seventh rotating shaft (7).

25. The multispeed automatic transmission according to claim 1, wherein a power take-off is located on at least one of the drive shaft (1), the output shaft (2), the third rotating shaft (3), the fourth rotating shaft (4), the fifth rotating shaft (5), the sixth rotating shaft (6) and the seventh rotating shaft (7) to provide power to an additional unit.

26. The multispeed automatic transmission according to claim 25, the power take-off is located on one of the drive shaft (1) and the output shaft (2).

27. The multispeed automatic transmission according to claim 1, wherein each of the plurality of shift elements (03, 04, 05, 15, 57, 67) is one of a power shift clutch and a power shift brake.

28. The multispeed automatic transmission according to claim 27, wherein each of the power shift clutches and the power shift brakes is one of a multiple disc clutch, a strap brake and a cone clutch.

29. The multispeed automatic transmission according to claim 1, wherein each of the plurality of shift elements (03, 04, 05, 15, 57, 67) is one of a frictional brake and a frictional clutch.

30. The multispeed automatic transmission according to claim 1, wherein at least one of a generator and an additional power machine is located on at least one of the drive shaft (1), the output shaft (2), the third rotating shaft (3), the fourth rotating shaft (4), the fifth rotating shaft (5), the sixth rotating shaft (6) and the seventh rotating shaft (7).

* * * * *